(12) United States Patent
Omori

(10) Patent No.: US 9,594,231 B2
(45) Date of Patent: Mar. 14, 2017

(54) INNER FOCUSING LENS

(71) Applicant: TAMRON CO., LTD., Saitama-shi, Saitama (JP)

(72) Inventor: Keisuke Omori, Saitama (JP)

(73) Assignee: TAMRON CO., LTD., Saitama-shi (JP)

( * ) Notice: Subject to any disclaimer, the term of this patent is extended or adjusted under 35 U.S.C. 154(b) by 0 days.

(21) Appl. No.: 15/083,660

(22) Filed: Mar. 29, 2016

(65) Prior Publication Data

US 2016/0291290 A1    Oct. 6, 2016

(30) Foreign Application Priority Data

Mar. 30, 2015  (JP) ................................. 2015-069442

(51) Int. Cl.
    *G02B 9/12*    (2006.01)
    *G02B 13/00*   (2006.01)
    *G02B 27/00*   (2006.01)

(52) U.S. Cl.
    CPC ........... *G02B 9/12* (2013.01); *G02B 13/0015* (2013.01); *G02B 27/0025* (2013.01)

(58) Field of Classification Search
    CPC ... G02B 9/12; G02B 9/34; G02B 9/36; G02B 9/60; G02B 9/62; G02B 9/64; G02B 13/0015
    USPC ................ 359/708–716, 745–748, 754–757, 359/763–765, 771, 772, 775, 784
    See application file for complete search history.

(56) References Cited

U.S. PATENT DOCUMENTS

| | | | | |
|---|---|---|---|---|
| 8,542,447 B2* | 9/2013 | Eguchi | ............... | G02B 27/4211 359/689 |
| 2014/0022438 A1* | 1/2014 | Kuzuhara | .......... | G02B 13/0015 348/345 |
| 2014/0340563 A1* | 11/2014 | Yamada | .................... | G02B 9/64 348/345 |
| 2015/0247989 A1* | 9/2015 | Sakai | ....................... | G02B 9/62 359/557 |

FOREIGN PATENT DOCUMENTS

JP    2013-97212 A    5/2013

OTHER PUBLICATIONS

U.S. Appl. No. 15/083,670, filed Mar. 29, 2016, Tamron Co., Ltd.
USPTO Office Action, U.S. Appl. No. 15/083,670, Nov. 16, 2016, 11 pages.

* cited by examiner

*Primary Examiner* — Darryl J Collins
(74) *Attorney, Agent, or Firm* — Foley & Lardner LLP

(57) ABSTRACT

An inner focusing lens has sequentially from the object side, a first lens group having a positive refractive power, a second lens group having a negative refractive power, and a third lens group having a negative refractive power. The first lens group has negative meniscus lenses disposed farthest on the object side thereof. The second lens group is moved along the optical axis whereby focusing from a focus state for an object at infinity to a focus state for the minimum object distance is performed. The inner focusing lens satisfies predetermined conditions and thereby, realizes a compact inner focusing lens having high imaging performance at wide angles, suitable for compact cameras having a function of capturing video.

9 Claims, 8 Drawing Sheets

FIRST EMBODIMENT

FIG.2
FIRST EMBODIMENT — FOCUS STATE FOR OBJECT AT INFINITY
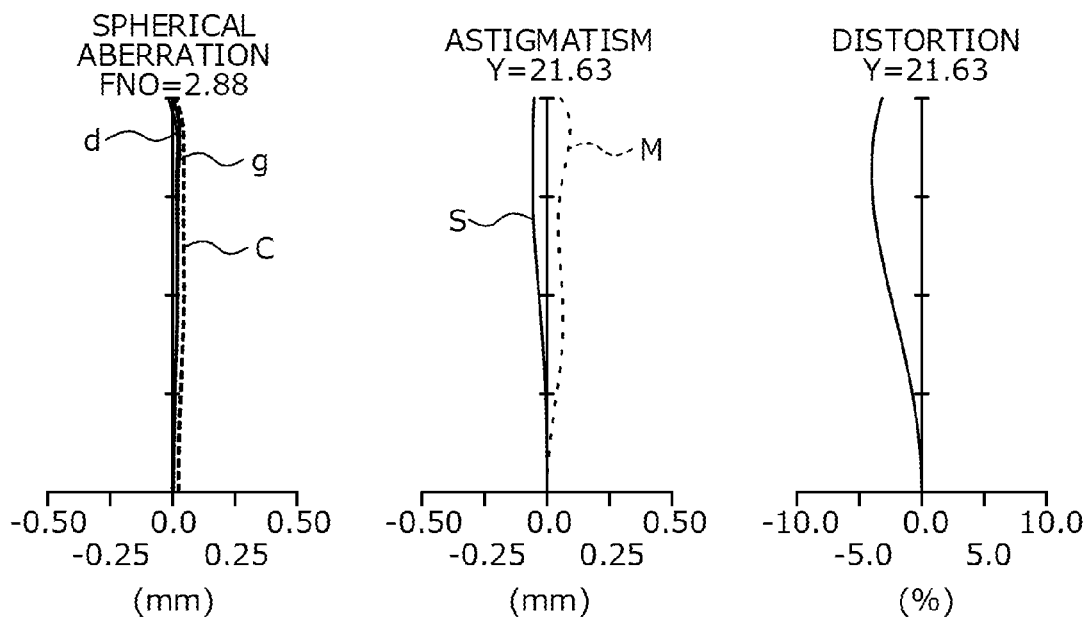
FOCUS STATE FOR MINIMUM OBJECT DISTANCE
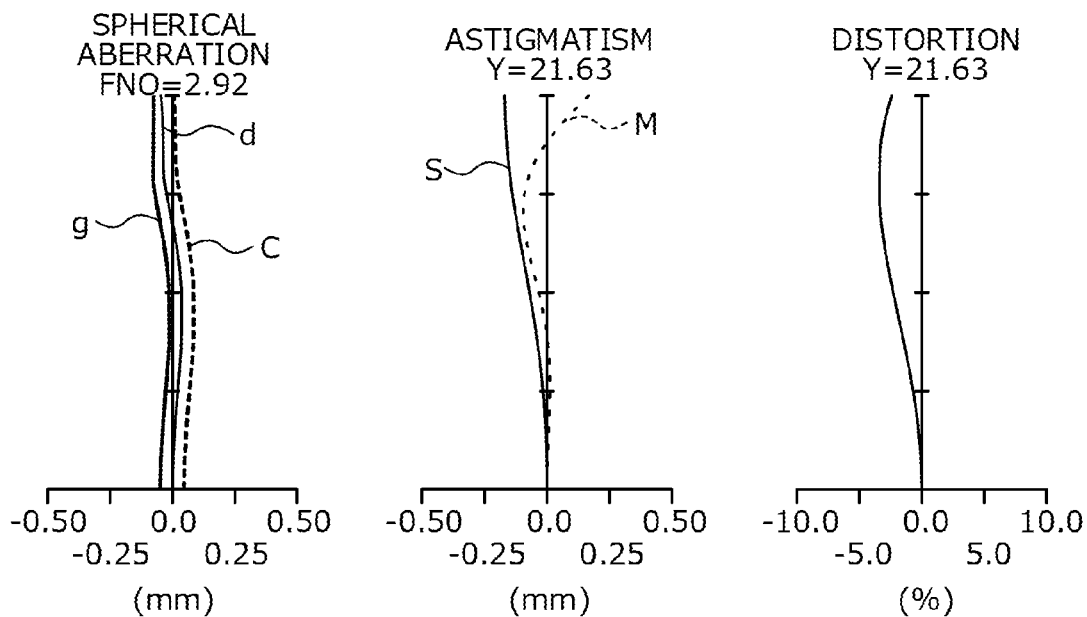

FIG.4
SECOND EMBODIMENT    FOCUS STATE FOR OBJECT AT INFINITY
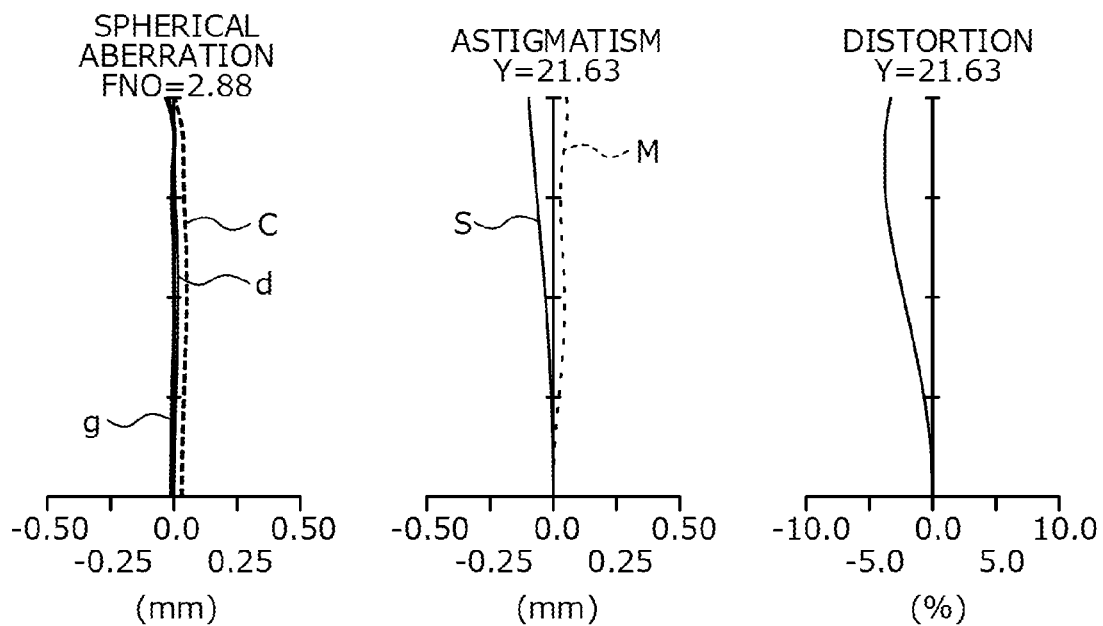
FOCUS STATE FOR MINIMUM OBJECT DISTANCE
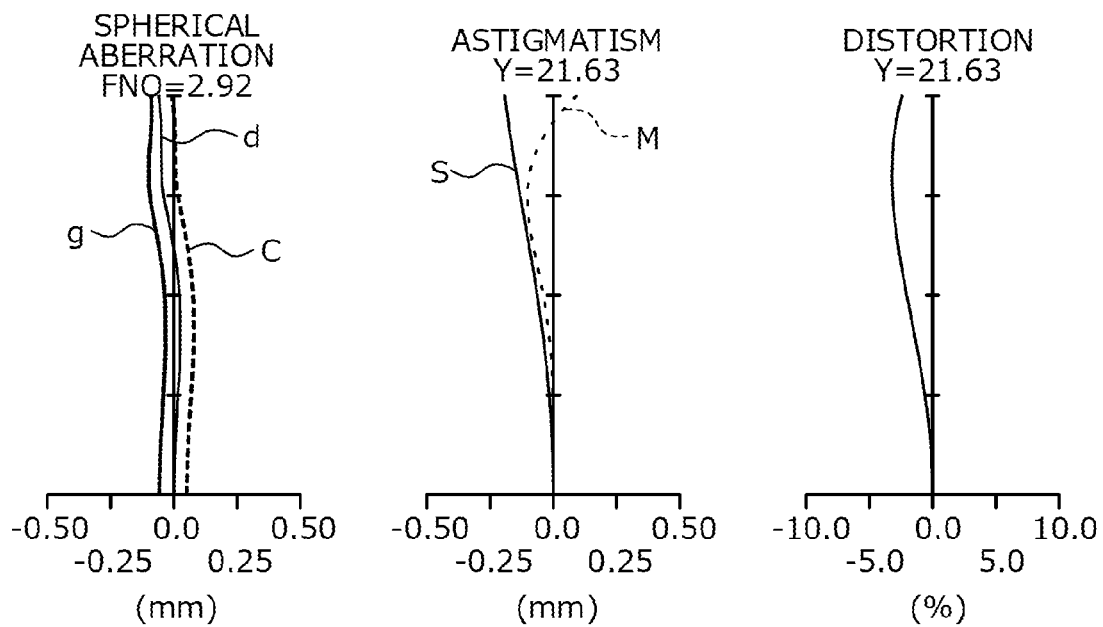

FIG.6
THIRD EMBODIMENT — FOCUS STATE FOR OBJECT AT INFINITY
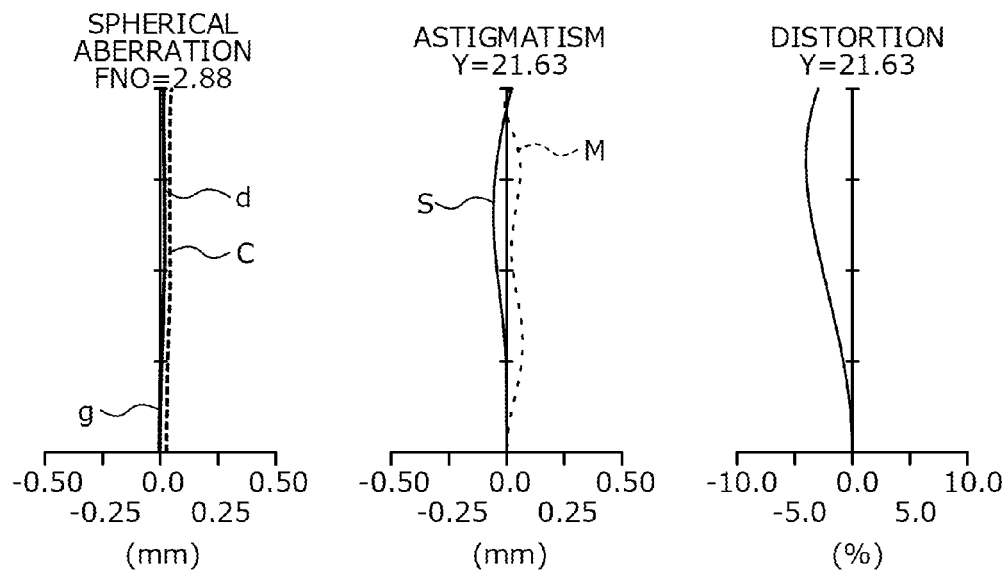
FOCUS STATE FOR MINIMUM OBJECT DISTANCE
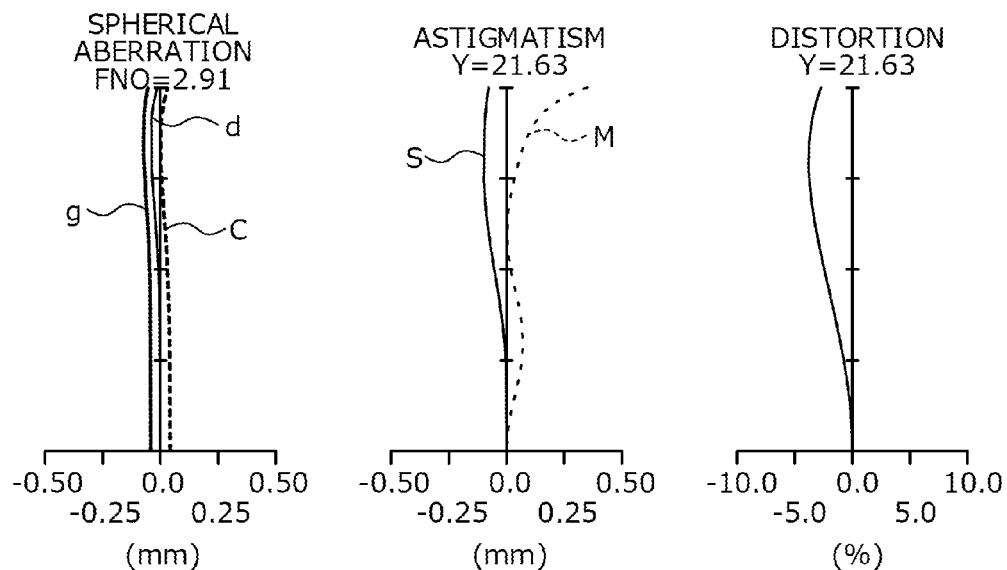

FIG.8
FOURTH EMBODIMENT    FOCUS STATE FOR OBJECT AT INFINITY
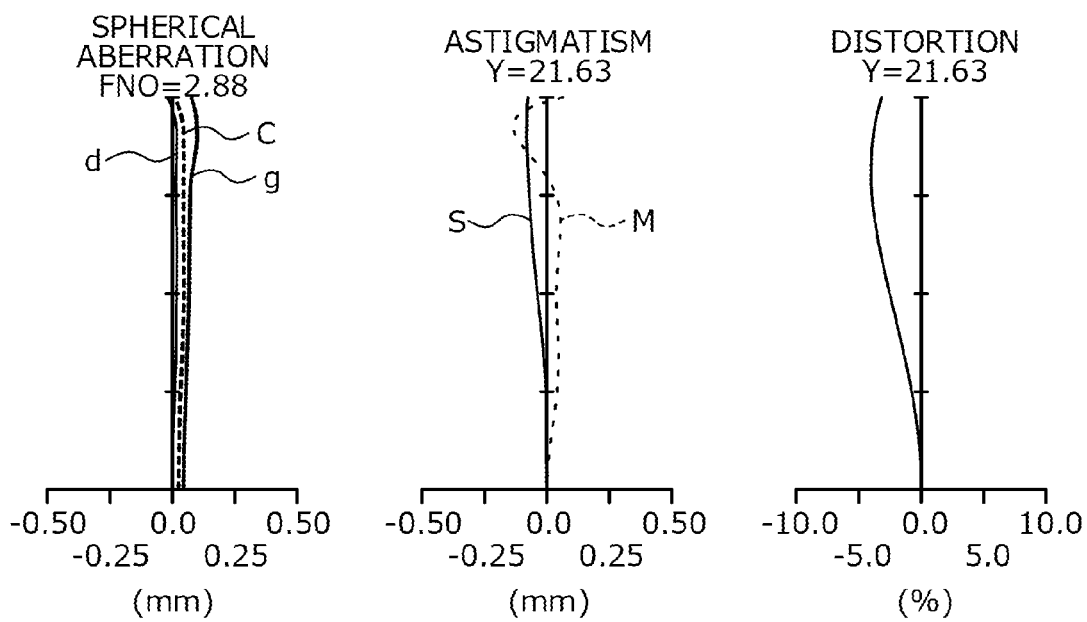
FOCUS STATE FOR MINIMUM OBJECT DISTANCE
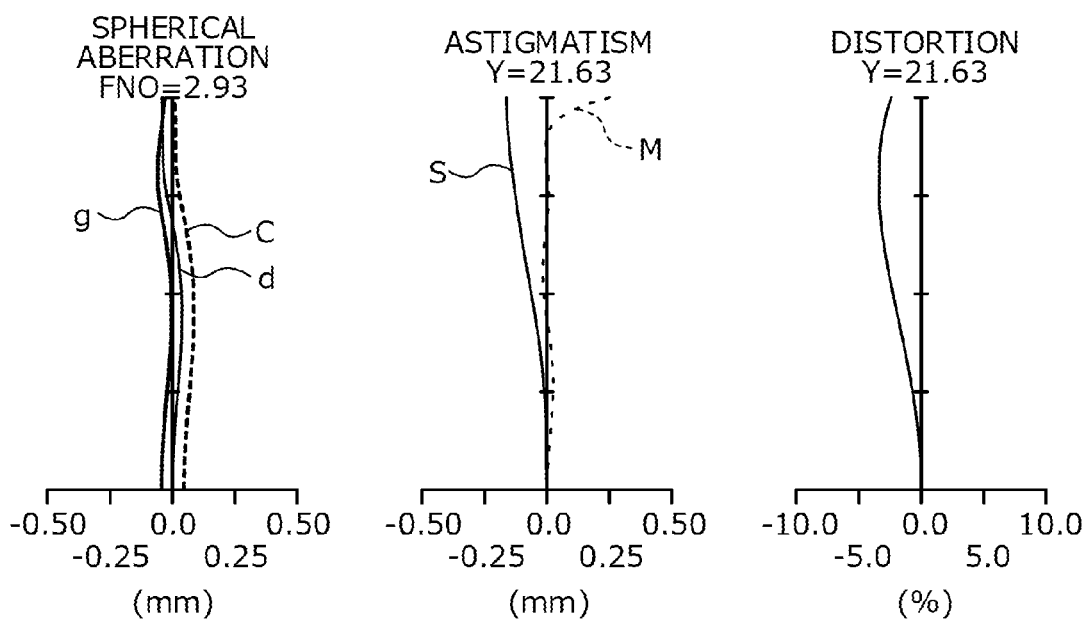

INNER FOCUSING LENS

CROSS REFERENCE TO RELATED APPLICATIONS

This application is based upon and claims the benefit of priority of the prior Japanese Patent Application No. 2015-069442, filed on Mar. 30, 2015, the entire contents of which are incorporated herein by reference.

BACKGROUND OF THE INVENTION

1. Field of the Invention

The present invention relates to a compact inner focusing lens having high imaging performance.

2. Description of the Related Art

Conventionally, a relatively long flange focal length has to be established with respect to the focal length and thus, many lenses for single-lens reflex cameras adopt a configuration that includes a positive lens group toward the rear of the optical system to easily establish back focus. Nonetheless, in recent years, camera bodies have decreased in size and consequent to the spread of digital cameras, instances where long flange focal lengths are not necessary are increasing.

Further, since video can also be captured by a digital camera, high-speed autofocus processing is desirable. In autofocus processing, a portion of a lens group (focusing group) is moved rapidly along the optical axis (wobble) to achieve transitions from a non-focused state→a focused state→a non-focused state. Further, a signal component of a specific frequency band of a partial image area is detected from the output signal of the image sensor; an optimal position of the focusing group achieving a focused state is determined; and the focusing group is moved to the optimal position. In particular, when video is captured, this series of operations has to be rapidly continued, repeatedly. Further, in the execution of wobble, the focusing group has to be light-weight and have the smallest diameter possible to enable rapid driving of the focusing group.

When a positive lens group is disposed farthest on the image side of an optical system, the refractive power of the focusing group has to be somewhat strong and therefore, the optical system becomes susceptible to aberration variations consequent to wobble and the effects of magnification. To suppress aberration variations consequent to wobble and the effects of magnification when focusing is performed, disposal of a negative element farthest on the image side of the optical system is desirable.

Thus, to address such demands, an inner focusing lens that can also sufficiently cope with video filming has been proposed (for example, refer to Japanese Patent Application Laid-Open Publication No. 2013-97212).

The inner focusing lens disclosed in Japanese Patent Application Laid-Open Publication No. 2013-97212 has sequentially from an object side, a first lens group having a positive refractive power, a second lens group having a negative refractive power, and a third lens group having a negative refractive power, where the second lens group is moved to perform focusing. The inner focusing lens has a medium telephoto focal length by a 35 mm film camera conversion and a small, light-weight focusing group internally.

On the other hand, conventionally, at an image sensor that optically receives and converts an optical image into an electronic image signal, there are limitations on the efficiency of taking in incident light by the on-chip micro lens, etc. and on the lens side, it is desirable for the exit pupil to be made to be greater than a certain diameter and to assure telecentricity of the luminous flux incident to the image sensor.

Nonetheless, with recent image sensors, improved aperture ratios and advances in the design freedom of on-chip micro lenses have reduced exit pupil limitations demanded on the imaging lens side. Furthermore, with recent software and camera system advances and improvements, even when distortion is significant to an extent that conventionally, the distortion would be conspicuous, correction by image processing has become possible.

Therefore, in conventional image lenses, although a positive lens element is disposed farthest on the image side of the optical system and telecentricity is assured, in recent years, this is no longer necessary and even when a negative lens element is disposed farthest on the image side of the optical system and there is oblique incidence of the luminous flux on the image sensor, vignetting (shading) consequent to mismatching of the on-chip micro lens and pupil, etc. has become inconspicuous. Further, since a negative lens element can now be disposed farthest on the image side of an optical system, reductions in the diameter of optical systems can be expected.

In contrast, with the inner focusing lens disclosed in Japanese Patent Application Laid-Open Publication No. 2013-97212, since a positive lens element is disposed farthest on the image side of the optical system, which has a shorter overall length, the diameter of the third lens group (lens farthest on the image side) cannot be sufficiently reduced. Therefore, application to cameras having a smaller dimension along the direction of the diameter of the optical system is difficult, such as mirrorless interchangeable-lens cameras that have come into wide use.

The inner focusing lens disclosed in Japanese Patent Application Laid-Open Publication No. 2013-97212 is not aimed for wide angle views and therefore, the correction of field curvature and distortion as well as assuring the amount of light at the lens ends necessary for wide angle views are points that have not been considered.

SUMMARY OF THE INVENTION

According to one aspect of the present invention an inner focusing lens includes sequentially from an object side thereof, a first lens group having a positive refractive power; a second lens group having a negative refractive power; and a third lens group having a negative refractive power. The first lens group includes farthest on an object side thereof, at least one negative meniscus lens. Focusing is performed from a focus state at infinity to a focus state for a minimum object distance by moving the second lens group along an optical axis, from the object side to an image side such that an interval between the first lens group and the second lens group increases and an interval between the second lens group and the third lens group decreases, while the first lens group and the third lens group remain fixed. The inner focusing lens satisfies a conditional expression (1) $-7.46 \leq f2/f \leq -2.11$, where $f2$ is a focal length of the second lens group at the focus state at infinity and $f$ is an overall optical-system focal length at the focus state at infinity.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 2 is a diagram of various types of aberration occurring in the inner focusing lens according to the first embodiment;

FIG. 4 is a diagram of various types of aberration occurring in the inner focusing lens according to second embodiment;

FIG. 6 is a diagram of various types of aberration occurring in the inner focusing lens according to the third embodiment;

FIG. 8 is a diagram of various types of aberration occurring in the inner focusing lens according to the fourth embodiment.

DETAILED DESCRIPTION OF THE PREFERRED EMBODIMENTS

Figure 1:
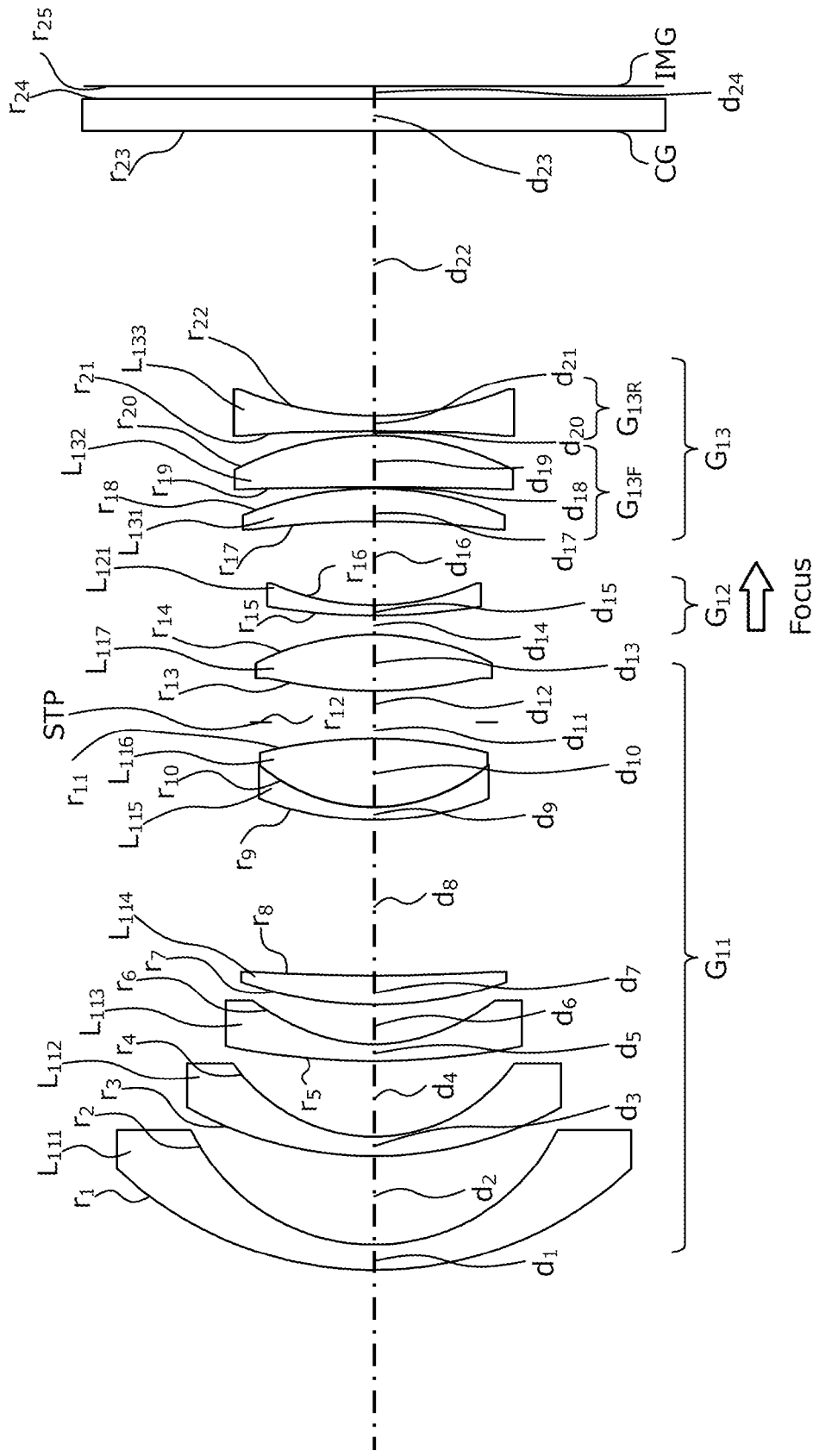
FIG. 1 is a diagram depicting, along the optical axis, a configuration of an inner focusing lens according to a first embodiment.

Preferred embodiments of an inner focusing lens according to the present invention will be described in detail.

The inner focusing lens according to the present invention is configured by a first lens group having a positive refractive power, a second lens group having a negative refractive power, and a third lens group having a negative refractive power, sequentially disposed from an object side.

In the inner focusing lens according to the present invention, the first lens group and the third lens group are fixed, while the second lens group is moved along an optical axis from an object side to an image side such that an interval between the first lens group and the second lens group increases and an interval between the second lens group and the third lens group decreases, whereby focusing from a focus state for an object at infinity to a focus state for the minimum object distance is performed. In this manner, by moving the second lens group to perform focusing, protection against dust and sound-proofing performance are enhanced without changes in the overall length of the optical system.

Further, by disposing farthest on the object side, the first lens group having a positive refractive power, the diameter of the luminous flux guided to the subsequent second lens group can be reduced. Therefore, the diameter of the second lens group, which is the focusing group, is reduced, enabling a reduction in the weight of second lens group to be facilitated. As a result, high-speed, silent focusing becomes possible, which is beneficial in capturing video. Further, since the diameter of the second lens group can be reduced, this is advantageous in reducing the diameter of the optical system.

Further, by disposing at least one negative meniscus lens farthest on the object side of the first lens group, wide angle views by the optical system are facilitated.

By disposing farthest on the image side, the third lens group having a negative refractive power, a default ratio (total length/focal length) is reduced, enabling a reduction of the back focus and further reductions in the size of the optical system.

To provide a compact inner focusing lens having a compact, light-weight focusing group, a wide angle focal length, and high imaging performance, in addition to the configuration described above, various conditions such as the following are set concerning the present invention.

In the inner focusing lens according to the present invention, the following conditional expression is preferably satisfied; where, f2 is the focal length of the second lens group at a focus state for an object at infinity; and f is the focal length of the optical system overall at a focus state for an object at infinity.

$$-7.46 \leq f2/f \leq -2.11 \tag{1}$$

Conditional expression (1) prescribes a ratio of the focal lengths of the second lens Group and the entire optical system at the focus state for an object at infinity. Satisfaction of conditional expression (1) enables reductions in the size of the optical system to be realized while maintaining high imaging performance (particularly effective in correcting field curvature).

Below the lower limit of conditional expression (1), the focal length of the second lens group increases and the negative power of the second lens group becomes too weak. As a result, the distance that the second lens group moves during focusing increases, thereby increasing the overall length of the optical system and making size reductions of the optical system difficult. On the other hand, above the upper limit of conditional expression (1), the focal length of the second lens group decreases and the negative power of the second lens croup becomes too strong. As a result, variations in aberration (in particular, variations in field curvature) and in angles of view accompanying movement of the second lens group during focusing increase and thus, is not desirable.

By satisfying conditional expression (1) within the following range, a more favorable effect can be expected.

$$-5.60 \leq f2/f \leq -1.80 \tag{1a}$$

By satisfying conditional expression (1a) within the following range, an even more favorable effect can be expected.

$$-5.00 \leq f2/f \leq -1.62 \tag{1b}$$

In the inner focusing lens according to the present invention, the following conditional expression is preferably satisfied; where f1 is the focal length of the first lens group at a focus state for an object at infinity and f is the focal length of the optical system overall at a focus state for an object at infinity.

$$0.28 \leq f1/f \leq 1.30 \tag{2}$$

Conditional expression (2) prescribes a ratio of the focal lengths of the first lens group and the optical system overall, at a focus state for an object at infinity. By satisfying conditional expression (2), the focal length of the first lens group becomes suitable with respect to the focal length of the optical system overall, enabling reductions in the overall length of the optical system and in the diameters of subsequent lenses, and improved imaging performance.

Below the lower limit of conditional expression (2), the focal length of the first lens group becomes short and spherical aberration correction becomes insufficient or the paraxial magnification of a subsequent lens group increases and the diameters of subsequent lenses increase, increasing the size of the optical system, and thus, is not desirable. On the other hand, above the upper limit of conditional expression (2), the focal length of the first lens group increases, increasing the overall length of the optical system, making size reductions of the optical system difficult.

By satisfying conditional expression (2) within the following range, a more favorable result can be expected.

$$0.37 \leq f1/f \leq 0.97 \quad (2a)$$

By satisfying conditional expression (2a) within the following range, an even more favorable result can be expected.

$$0.45 \leq f1/f \leq 0.80 \quad (2b)$$

In the inner focusing lens according to the present invention, the following conditional expression is preferably satisfied; where βinf is the paraxial magnification of the second lens group at a focus state for an object at infinity and β mod is the paraxial magnification of the second lens croup at a focus state for the minimum object distance.

$$0.50 \leq \beta inf/\beta \ mod \leq 2.02 \quad (3)$$

Conditional expression (3) prescribes a ratio of the paraxial transverse magnification of the second lens group at a focus state for an object at infinity and at a focus state for the minimum object distance. By satisfying conditional expression (3), changes in magnification can be suppressed even when the focusing group (second lens group) is moved and field of view variations can be suppressed during focusing. If the range prescribed by conditional expression (3) is deviated from, field of view variations cannot be suppressed during focusing. If field of view variation occurs while the focusing group is moving, the image looks blurred and image quality drops.

By satisfying conditional expression (3) within the following range, a more favorable effect can be expected.

$$0.60 \leq \beta inf/\beta \ mod \leq 1.80 \quad (3a)$$

By satisfying conditional expression (3a) within the following range, an even more favorable effect can be expected.

$$0.68 \leq \beta inf/\beta \ mod \leq 1.60 \quad (3b)$$

By further satisfying conditional expression (3b) within the following range, field of view variations during focusing can be made extremely small.

$$0.80 \leq \beta inf/\beta \ mod \leq 1.40 \quad (3c)$$

In the inner focusing lens according to the present invention, the third lens group includes sequentially from the object side, a front lens subgroup having a positive refractive power and a rear lens subgroup having a negative refractive power; and an axial air gap that is widest in the third lens group is formed between the front lens subgroup and the rear lens subgroup.

By such a configuration, the lens diameter near the imaging plane is reduced and imaging performance can be improved. In other words, increased lens diameter on the image side (an issue in reducing the size of optical systems having a short flange focal length and for mounting on compact cameras such as mirrorless interchangeable-lens cameras) can be suppressed by disposing on the object side of the third lens group, the front lens subgroup having a positive refractive power. Further, by disposing the rear lens subgroup (having a negative refractive power) on the image side of the front lens subgroup to form an air gap, axial aberration can be corrected by the front lens subgroup having a positive refractive power; and at the rear lens subgroup, off axis aberration, in particular, distortion, can be favorably corrected.

In the inner focusing lens according to the present invention, a simple lens element having a negative refractive power is preferably disposed farthest on the image side of the third lens group. With such configuration, the diameter of the third lens group (lens farthest on the image side) can be further reduced, which is optimal for compact cameras such as mirrorless interchangeable-lens cameras that have come into wide-spread use in recent years.

A simple lens element includes a single ground lens, an aspheric lens, a compound aspheric lens, and a cemented lens; and a simple lens element does not include, for example, two positive lenses, etc. where the elements are not bonded to one another to have a layer of air therebetween.

In addition to disposing farthest on the image side of the third lens group, a simple lens element having a negative refractive power, in the inner focusing lens according to the present invention, the following conditional expression is preferably satisfied, where R1 is the radius of curvature of the surface at an air interface, on the object side of the simple lens element having a negative refractive power; and R2 is the radius of curvature of the surface at an air interface, on the image side of the simple lens element having a negative refractive power.

$$0 \leq (R1+R2)/(R1-R2) \quad (4)$$

Conditional expression (4) prescribes the shape of the simple lens element having a negative refractive power and disposed farthest on the image side of the third lens group. By satisfying conditional expression (4), the radius of curvature of the surface on the object side of the simple lens element becomes greater than the radius of curvature of the surface on the image side thereof. As a result, favorable correction of off-axis coma becomes possible.

By satisfying conditional expression (4) within the following range, a more favorable effect can be expected.

$$0.5(R1+R2)/(R1-R2) \quad (4a)$$

By satisfying conditional expression (4a) within the following range, more effective correction of off axis coma is achieved.

$$0.7 \leq (R1+R2)/(R1-R2) \leq 100 \quad (4b)$$

The inner focusing lens according to the present invention has an aperture stop that sets a predetermined diameter and in the inner focusing lens the following conditional expression is preferably satisfied, where L1s is the axial distance from the surface farthest on the object side of the first lens group to the aperture stop, and L is the axial distance (overall length of the optical system) from the apex of the lens surface farthest on the object side in the optical system to the imaging plane.

$$0.24 \leq L1s/L \leq 0.95 \quad (5)$$

Conditional expression (5) prescribes a ratio of the axial distance from the surface farthest on the object side of the first lens group to the aperture stop and the axial distance of the entire optical system. By satisfying conditional expression (5), an optimal position of the aperture stop is determined with respect to the overall length of the optical system, enabling reduction of the optical system diameter while maintaining high imaging performance.

Below the lower limit of conditional expression (5), the aperture stop is too close to the object side, the lens diameter on the image side increases, and at the rear group, the occurrence of off-axis aberration, primarily distortion, becomes conspicuous and therefore, is not desirable. On the other hand, above the upper limit of conditional expression (5), the aperture stop is to too close to the image side and with the increase in the effective diameter of the front lens, size reductions of the optical system become difficult. The aperture stop is preferably disposed in the first lens group.

By satisfying conditional expression (5) within the following range, a more favorable effect can be expected.

$$0.32 \leq L1s/L \leq 0.71 \tag{5a}$$

By satisfying conditional expression (5a) within the following range, an even more favorable effect can be expected.

$$0.40 \leq L1s/L \leq 0.60 \tag{5b}$$

In the inner focusing lens according to the present invention, preferably, the second lens group is configured by a simple lens element having a negative refractive power. The definition of the simple lens element here is as described above.

By configuring the second lens group by a simple lens element having a negative refractive power, reductions in the size and weight of the focusing group can be achieved, enabling faster focusing, which is beneficial in capturing video. Reductions in the size and weight of the focusing group decrease the load on the driving mechanism such as an actuator for driving the focusing group, contributing to reduced power consumption. Further, the capacity of the driving mechanism can be reduced.

In the inner focusing lens according to the present invention, the following conditional expression is preferably satisfied; where, f3 is the focal length of the third lens group at a focus state for an object at infinity; and f is the focal length of the optical system at a focus state for an object at infinity.

$$f3/fs \leq -29.1 \tag{6}$$

Conditional expression (6) prescribes a ratio of the focal length of the third lens Group and the focal length of the optical system overall, at a focus state for an object at infinity. By satisfying conditional expression (6), the refractive power of the third lens group is optimized and reductions in the overall length and diameter of the optical system can be realized without degrading of the imaging performance.

Above the upper limit of conditional expression (6), the refractive power of the third lens group becomes strong. In this case, the F number in the optical system overall tends to be large and a bright optical system cannot be obtained. To realize a bright optical system in this state, the aperture stop has to be opened widely. However, if the aperture stop is opened widely, various types of aberration become prominent and therefore, to realize an optical system having favorable imaging performance, the number of lenses for correcting aberration has to be increased. In particular, the number of lenses configuring the first lens group has to be increased. When the optical system is configured by a large number of lenses, reductions in the size and weight of the optical system become difficult and thus, a large number of lenses is not desirable.

By satisfying conditional expression (6) within the following range, a more favorable effect can be expected.

$$-12000 \leq f3/fs \leq -30.1 \tag{6a}$$

By satisfying conditional expression (6a) within the following range, an even more favorable effect can be expected.

$$-10000 \leq f3/fs \leq -31.1 \tag{6b}$$

In the inner focusing lens according to the present invention, preferably, the third lens group is configured to include a simple lens element having a negative refractive power and more preferably, the simple lens element is formed of a single glass material. By forming the simple lens element in the third lens group of a single glass material, a reduction in a thickness and diameter of the simple lens element can be facilitated. Further, a reduction of the weight of the simple lens element can be facilitated.

The inner focusing lens according to the present invention preferably satisfies the following conditional expression where vdn is the Abbe number with respect to d-line of the simple lens having a negative refractive power.

$$30 \leq vdn \tag{7}$$

Below the lower limit of conditional expression (7), chromatic difference of magnification is overcorrected, making high imaging performance difficult to maintain and therefore, is undesirable.

In the inner focusing lens according to the present invention, the following conditional expression is preferably satisfied; where, R21 is the radius of curvature of the surface farthest on the image side of the second lens group and R22 is the radius of curvature of the surface farthest on the image side of the second lens group.

$$0 \leq (R21+R22)/(R21-R22) \tag{8}$$

Conditional expression (8) prescribes the shapes of the surfaces farthest on the object side and on the image side of the second lens group. By satisfying conditional expression (8), in the second lens group, the radius of curvature of the surface farthest on the image side becomes smaller than the radius of curvature of the surface farthest on the object side. As a result, variation of the angle of the light rays incident on the surface and having a strong power becomes small, enabling variation of the field curvature during focusing to be suppressed.

By satisfying conditional expression (8) within the following range, a more favorable result can be expected.

$$1 \leq (R21+R22)/(R21-R22) \tag{8a}$$

By satisfying conditional expression (8) within the following range, an even more favorable result can be expected.

$$1 \leq (R21+R22)/(R21-R22) \leq 300 \tag{8b}$$

In the inner focusing lens according to the present invention, disposal a positive aspheric lens in the first lens group is beneficial in correcting spherical aberration. In particular, by forming the positive lens to have an aspheric surface that weakens the power of paraxial curvature, the effectiveness of spherical aberration correction is improved.

In the inner focusing lens according to the present invention, by forming an aspheric surface on a lens configuring the second lens group, correction of field curvature becomes more effective. In particular, by forming a lens configuring the second lens group to have an aspheric surface that weakens the power of paraxial curvature, correction of field curvature is further improved and the effect of suppressing field curvature variation during focusing becomes higher.

In the inner focusing lens according to the present invention, forming an aspheric surface on a lens of the third lens group is beneficial in correcting field curvature. In particular, by forming a lens of the third lens group to have an aspheric surface that weakens the power of paraxial curvature, the corrective effect on field curvature is improved.

As described above, according to the present invention, a compact inner focusing lens can be realized that has high imaging performance, a wide angle focal length, and a compact, light-weight focusing group. In particular, by satisfying the conditional expressions above, a compact inner focusing lens having high imaging performance and suitable for capturing video can be realized.

Embodiments of the inner focusing lens according to the present invention will be described in detail with reference to the accompanying drawings. The invention is not limited by the embodiments below.

FIG. 1 is a diagram depicting, along the optical axis, a configuration of the inner focusing lens according to a first embodiment. FIG. 1 depicts a focus state for an object at infinity. The inner focusing lens includes sequentially from an object side nearest a non-depicted object, a first lens group $G_{11}$ having a positive refractive power, a second lens group $G_{12}$ having a negative refractive power, and a third lens group $G_{13}$ having a negative refractive power. A cover glass CG is disposed between the third lens group $G_{13}$ and the imaging plane IMG.

The first lens group $G_{11}$ has sequentially from the object side, a negative meniscus lens a negative meniscus lens $L_{112}$, a negative lens $L_{113}$, a positive lens $L_{114}$, a negative lens $L_{115}$, a positive lens $L_{116}$, an aperture stop STP setting a predetermined diameter, and a positive lens $L_{11}$. Both surfaces of the negative lens $L_{113}$ are aspheric. The negative lens $L_{115}$ and the positive lens $L_{116}$ are cemented. Both surfaces of the positive lens $L_{117}$ are aspheric.

The second lens group $G_{12}$ is configured by a negative lens $L_{121}$. Both surfaces of the negative lens $L_{121}$ are aspheric.

The third lens group $G_{13}$ has sequentially from the object side, a front lens subgroup $G_{13F}$ having a positive refractive power and a rear lens subgroup $G_{13R}$ having a negative refractive power. An axial air gap that is widest in the third lens group $G_{13}$ is formed between the front lens subgroup $G_{13F}$ and the rear lens subgroup $G_{13R}$.

The front lens subgroup $G_{13F}$ has sequentially from the object side, a positive lens $L_{131}$ and a positive lens $L_{132}$. The rear lens subgroup $G_{13R}$ is configured by a negative lens $L_{133}$. The negative lens $L_{133}$ is formed of a single glass material. Both surfaces of the negative lens $L_{133}$ are aspheric.

in the inner focusing lens, the first lens group $G_{11}$ and the third lens group $G_{13}$ are fixed, while the second lens group $G_{12}$ is moved along the optical axis from the object side to an imaging plane IMG side such that the interval between the first lens group $G_{11}$ and the second lens group $G_{12}$ is increased and the interval between the second lens group $G_{12}$ and the third lens group $G_{13}$ is decreased, whereby focusing is performed from a focus state for an object at infinity to a focus state for the minimum object distance.

Here, various values related to the inner focusing lens according to the first embodiment are given.

(Lens Data)

$r_1 = 28.832$
$d_1 = 2.000$  $nd_1 = 1.5935$  $vd_1 = 67.00$
$r_2 = 15.623$
$d_2 = 6.886$
$r_3 = 29.397$
$d_3 = 1.500$  $nd_2 = 1.4970$  $vd_2 = 81.61$
$r_4 = 13.122$
$d_4 = 5.883$
$r_5 = 52.568$ (aspheric surface)
$d_5 = 1.300$  $nd_3 = 1.5920$  $vd_3 = 67.02$
$r_6 = 12.910$ (aspheric surface)

-continued $d_6 = 3.068$
$r_7 = 30.333$
$d_7 = 2.265$  $nd_4 = 1.8810$  $vd_4 = 40.14$
$r_8 = 141.737$
$d_8 = 12.099$
$r_9 = 24.676$
$d_9 = 1.000$  $nd_5 = 1.8810$  $vd_5 = 40.14$
$r_{10} = 13.601$
$d_{10} = 5.292$  $nd_6 = 1.4875$  $vd_6 = 70.44$
$r_{11} = -35.502$
$d_{11} = 1.300$
$r_{12} = \infty$ (aperture stop)
$d_{12} = 2.425$
$r_{13} = 30.850$ (aspheric surface)
$d_{13} = 4.386$  $nd_7 = 1.4971$  $vd_7 = 81.56$
$r_{14} = -18.338$ (aspheric surface)
$d_{14} = D(14)$ (variable)
$r_{15} = 45.781$ (aspheric surface)
$d_{15} = 0.800$  $nd_8 = 1.7290$  $vd_8 = 54.04$
$r_{16} = 19.193$ (aspheric surface)
$d_{16} = D(16)$ (variable)
$r_{17} = -68.737$
$d_{17} = 2.535$  $nd_9 = 1.4970$  $vd_9 = 81.61$
$r_{18} = -25.555$
$d_{18} = 0.100$
$r_{19} = -329.577$
$d_{19} = 4.036$  $nd_{10} = 1.4970$  $vd_{10} = 81.61$
$r_{20} = -23.042$
$d_{20} = 0.329$
$r_{21} = -400.000$ (aspheric surface)
$d_{21} = 1.200$  $nd_{11} = 1.8820$  $vd_{11} = 37.22$
$r_{22} = 26.785$ (aspheric surface)
$d_{22} = 25.606$
$r_{23} = \infty$
$d_{23} = 2.500$  $nd_{12} = 1.5168$  $vd_{12} = 64.20$
$r_{24} = \infty$
$d_{24} = 1.000$
$r_{25} = \infty$ (imaging plane)

Constant of the Cone (k) and Aspheric Coefficients ($A_4$, $A_6$, $A_8$, $A_{10}$)

(Fifth Order)

$k = 0$,
$A_4 = -2.6625 \times 10^{-5}$, $A_6 = 3.0031 \times 10^{-7}$,
$A_8 = -1.7989 \times 10^{-9}$, $A_{10} = 5.7847 \times 10^{-12}$
(Sixth Order)

$k = 0$,
$A_4 = -6.8334 \times 10^{-5}$, $A_6 = 8.4364 \times 10^{-9}$,
$A_8 = -1.2228 \times 10^{-9}$, $A_{10} = -9.8374 \times 10^{-12}$
(Thirteenth Order)

$k = 0$,
$A_4 = -2.2269 \times 10^{-5}$, $A_6 = 1.1253 \times 10^{-9}$,
$A_8 = -1.056 \times 10^{-9}$, $A_{10} = -3.1969 \times 10^{-12}$
(Fourteenth Order)

$k = 0$,
$A_4 = 5.1791 \times 10^{-5}$, $A_6 = -5.2286 \times 10^{-7}$,
$A_8 = 4.0083 \times 10^{-9}$, $A_{10} = 2.3692 \times 10^{-11}$
(Fifteenth Order)

$k = 0$,
$A_4 = 2.0348 \times 10^{-5}$, $A_6 = -1.1141 \times 10^{-6}$,
$A_8 = 1.4175 \times 10^{-8}$, $A_{10} = -5.7786 \times 10^{-11}$
(Sixteenth Order)

$k = 0$,
$A_4 = 2.1580 \times 10^{-5}$, $A_6 = -8.9505 \times 10^{-7}$,
$A_8 = 1.2780 \times 10^{-8}$, $A_{10} = -5.7413 \times 10^{-11}$
(Twenty-first Order)

$k = 0$,
$A_4 = -2.4151 \times 10^{-5}$, $A_6 = -1.3394 \times 10^{-7}$,
$A_8 = 2.2182 \times 10^{-9}$, $A_{10} = -7.5852 \times 10^{-12}$ -continued (Twenty-second Order)

k = 0,
$A_4 = -3.5206 \times 10^{-6}$, $A_6 = -1.2925 \times 10^{-7}$,
$A_8 = 2.2655 \times 10^{-9}$, $A_{10} = -8.5817 \times 10^{-12}$ (Focal State Data)

| | Infinity | Minimum Object Distance (object distance 158.000 mm) |
|---|---|---|
| D(14) | 1.472 | 2.318 |
| D(16) | 6.519 | 5.674 |
| f (focal length of optical system overall) | 18.54 | 17.88 |
| FNO (F number) | 2.88 | 2.92 |
| ω (half angle of view) | 50.29 | 49.76 |
| f1 (focal length of first lens group $G_{11}$) | 10.28 | 10.28 |
| f2 (focal length of second lens group $G_{12}$) | −45.92 | −45.92 |
| f3 (focal length of third lens group $G_{13}$) | −722.75 | −722.75 |
| BF (back focus) | 29.106 | 29.106 |

(Values Related to Conditional Expression (1))

$f2/f=-2.48$ (Values Related to Conditional Expression (2))

$f1/f=0.55$ (Values Related to Conditional Expression (3))
βinf (paraxial magnification of second lens group focus state for object at infinity)=1.83
β mod (paraxial magnification of second lens group $G_{12}$ at focus state for minimum object distance)=1.81

βinf/β mod=1.01

(Values Related to Conditional Expression (4))
R1 (radius of curvature of surface at air interface on object side of negative lens $L_{133}$)=−400.000
R2 (radius of curvature of surface at air interface on image side of negative lens $L_{133}$)=26.785

$(R1+R2)/(R1-R2)=0.87$ (Values Related to Conditional Expression (5))
L1s (axial distance from surface farthest on object side of first lens group $G_{11}$ to aperture stop STP)=42.593
L (axial distance from apex of lens surface farthest on object side of first lens group $G_{11}$ to imaging plane IMG (overall length of optical system))=95.501

$L1s/L=0.45$ (Values Related to Conditional Expression (6))

$f3/f=-38.97$ (Values Related to Conditional Expression (7))
νdn (Abbe number with respect to d-line of negative lens $L_{133}$)=37.22
(Values Related to Conditional Expression (8))
R21 (radius of curvature of surface farthest on object side of negative lens $L_{121}$)=45.781

R22 (radius of curvature of surface farthest on image side of negative lens $L_{121}$)=19.193

$(R21+R22)/(R21-R22)=2.44$

FIG. 2 is a diagram of various types of aberration occurring in the inner focusing lens according to the first embodiment. In the diagram, for curves depicting spherical aberration, the vertical axis represents the F number (Fno), solid lines depict wavelength characteristics corresponding to d-line (λ=587.56 nm), dotted lines depict wavelength characteristics corresponding to g-line (λ=435.84 nm), and dashed lines depict wavelength characteristics corresponding to C-line (λ=656.28 nm). For curves depicting astigmatism, the vertical axis represents the maximum image height (Y), S represents characteristics of the sagittal plane and M represents characteristics of the meridional plane. For curves depicting distortion, the vertical axis represents the maximum image height (Y) and wavelength characteristics corresponding to d-line are depicted.

Figure 3:
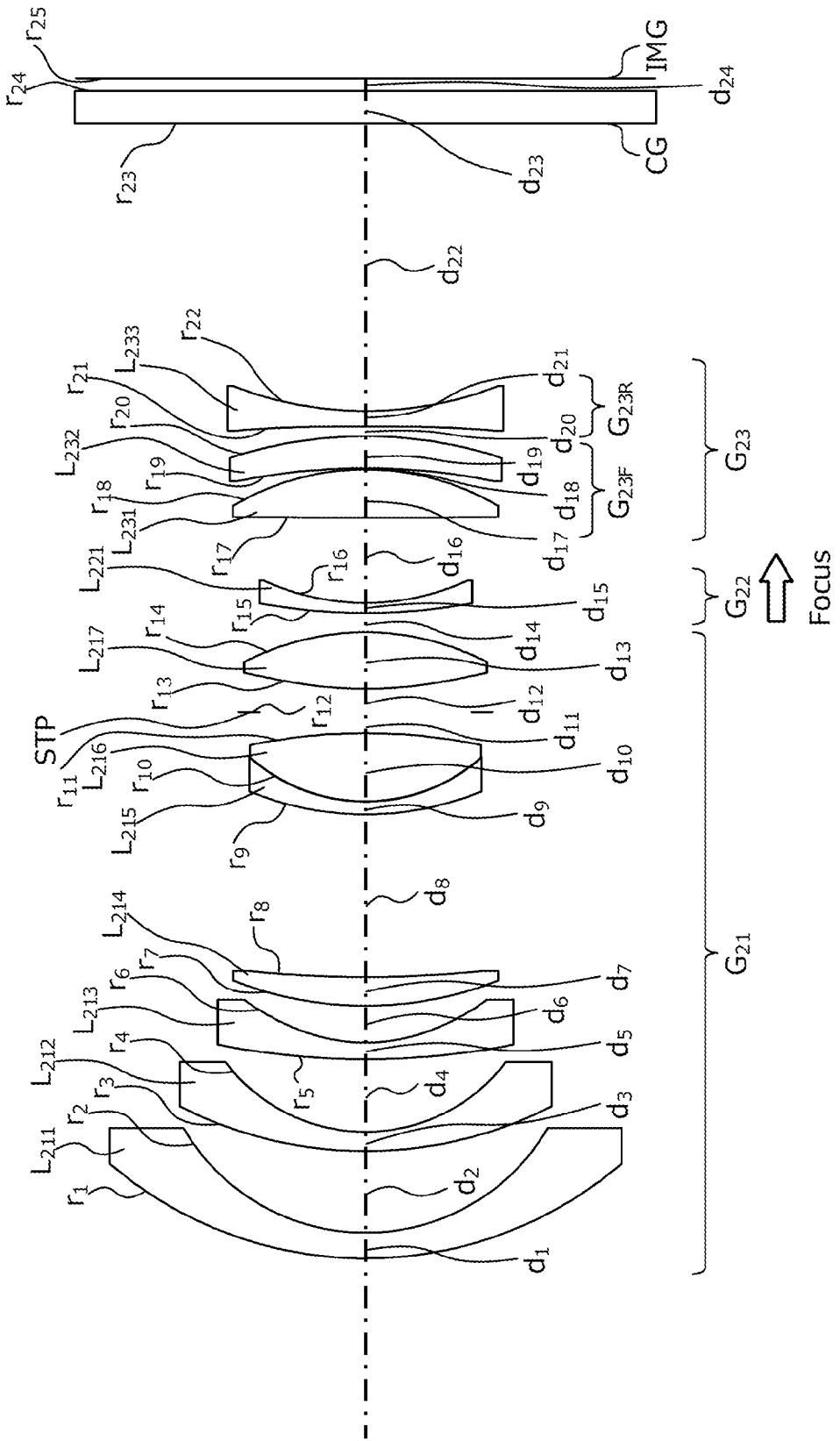
FIG. 3 is a diagram depicting, along the optical axis, a configuration of the inner focusing lens according to a second embodiment.

FIG. 3 is a diagram depicting, along the optical axis, a configuration of the inner focusing lens according to a second embodiment. FIG. 3 depicts a focus state for an object at infinity. The inner focusing lens has sequentially from the object side, a first lens group $G_{21}$ having a positive refractive power, a second lens group $G_{22}$ having a negative refractive power, and a third lens group $G_{23}$ having a negative refractive power. The cover glass CG is disposed between the third lens croup $G_{23}$ and the imaging plane IMG.

The first lens group $G_{21}$ has sequentially from the object side, a negative meniscus lens $L_{211}$, a negative meniscus lens $L_{212}$, a negative lens $L_{213}$, a positive lens $L_{214}$, a negative lens $L_{215}$, a positive lens $L_{216}$, the aperture stop STP setting a predetermined diameter, and a positive lens $L_{217}$. Both surfaces of the negative lens $L_{213}$ are aspheric. The negative lens $L_{215}$ and the positive lens $L_{216}$ are cemented. Both surfaces of the positive lens $L_{217}$ are aspheric.

The second lens group $G_{22}$ is configured by a negative lens $L_{221}$. Both surfaces of the negative lens $L_{221}$ as aspheric.

The third lens group $G_{23}$ has sequentially from the object side, a front lens subgroup $G_{23F}$ having a positive refractive power and a rear lens subgroup $G_{23R}$ having a negative refractive power. An axial air gap that is widest in the third lens group $G_{23}$ is formed between the front lens subgroup $G_{23F}$ and the rear lens subgroup $G_{23R}$.

The front lens subgroup $G_{23F}$ has sequentially from the object side, a positive lens $L_{231}$ and a positive lens $L_{232}$. The rear lens subgroup $G_{23R}$ is configured by a negative lens $L_{233}$. The negative lens $L_{233}$ is formed of a single glass material. Both surfaces of the negative lens $L_{233}$ are aspheric.

In the inner focusing lens, the first lens group $G_{21}$ and the third lens group $G_{23}$ are fixed, while the second lens group $G_{22}$ is moved along the optical axis from the object side to the imaging plane IMG side such that the interval between the first lens group $G_{21}$ and the second lens group $G_{22}$ is increased and the interval between the second lens group $G_{22}$ and the third lens Group $G_{23}$ is decreased, whereby focusing is performed from a focus state for an object at infinity to a focus state for the minimum object distance.

Here, various values related to the inner focusing lens according to the second embodiment are given.

(Lens Data)

| | | | |
|---|---|---|---|
| $r_1$ = 30.152 | | | |
| $d_1$ = 2.000 | | $nd_1$ = 1.5935 | $νd_1$ = 67.00 |
| $r_2$ = 16.214 | | | |
| $d_2$ = 6.369 | | | |

-continued

| (Lens Data) | | |
|---|---|---|
| $r_3 = 31.366$ | | |
| $d_3 = 1.500$ | $nd_2 = 1.4970$ | $vd_2 = 81.61$ |
| $r_4 = 13.499$ | | |
| $d_4 = 5.658$ | | |
| $r_5 = 51.837$ (aspheric surface) | | |
| $d_5 = 1.300$ | $nd_3 = 1.5920$ | $vd_3 = 67.02$ |
| $r_6 = 13.285$ (aspheric surface) | | |
| $d_6 = 2.866$ | | |
| $r_7 = 27.620$ | | |
| $d_7 = 2.238$ | $nd_4 = 1.8810$ | $vd_4 = 40.14$ |
| $r_8 = 87.188$ | | |
| $d_8 = 12.690$ | | |
| $r_9 = 23.272$ | | |
| $d_9 = 1.000$ | $nd_5 = 1.8810$ | $vd_5 = 40.14$ |
| $r_{10} = 13.324$ | | |
| $d_{10} = 5.334$ | $nd_6 = 1.4875$ | $vd_6 = 70.44$ |
| $r_{11} = -43.127$ | | |
| $d_{11} = 1.629$ | | |
| $r_{12} = \infty$ (aperture stop) | | |
| $d_{12} = 1.822$ | | |
| $r_{13} = 30.203$ (aspheric surface) | | |
| $d_{13} = 4.424$ | $nd_7 = 1.4971$ | $vd_7 = 81.56$ |
| $r_{14} = -18.833$ (aspheric surface) | | |
| $d_{14} = D(14)$ (variable) | | |
| $r_{15} = 42.496$ (aspheric surface) | | |
| $d_{15} = 0.800$ | $nd_8 = 1.7290$ | $vd_8 = 54.04$ |
| $r_{16} = 18.812$ (aspheric surface) | | |
| $d_{16} = D(16)$ (variable) | | |
| $r_{17} = 647.460$ | | |
| $d_{17} = 3.783$ | $nd_9 = 1.4970$ | $vd_9 = 81.61$ |
| $r_{18} = -19.801$ | | |
| $d_{18} = 0.100$ | | |
| $r_{19} = -48.734$ | | |
| $d_{19} = 2.492$ | $nd_{10} = 1.4970$ | $vd_{10} = 81.61$ |
| $r_{20} = -33.384$ | | |
| $d_{20} = 0.761$ | | |
| $r_{21} = -400.000$ (aspheric surface) | | |
| $d_{21} = 1.200$ | $nd_{11} = 1.8820$ | $vd_{11} = 37.22$ |
| $r_{22} = 27.667$ (aspheric surface) | | |
| $d_{22} = 22.428$ | | |
| $r_{23} = \infty$ | | |
| $d_{23} = 2.500$ | $nd_{12} = 1.5168$ | $vd_{12} = 64.20$ |
| $r_{24} = \infty$ | | |
| $d_{24} = 1.000$ | | |
| $r_{25} = \infty$ (imaging plane) | | |

Constant of the Cone (k) and Aspheric Coefficients ($A_4$, $A_6$, $A_8$, $A_{10}$)

(Fifth Order)

$k = 0$,
$A_4 = -2.7090 \times 10^{-5}$, $A_6 = 2.6283 \times 10^{-7}$,
$A_8 = -1.4454 \times 10^{-9}$, $A_{10} = 4.3803 \times 10^{-12}$ (Sixth Order)

$k = 0$,
$A_4 = -6.1483 \times 10^{-5}$, $A_6 = 4.0703 \times 10^{-8}$,
$A_8 = -1.1388 \times 10^{-9}$, $A_{10} = -6.0150 \times 10^{-12}$ (Thirteenth Order)

$k = 0$,
$A_4 = -2.2964 \times 10^{-5}$, $A_6 = -6.1034 \times 10^{-9}$,
$A_8 = -1.0258 \times 10^{-9}$, $A_{10} = 2.5147 \times 10^{-12}$ (Fourteenth Order)

$k = 0$,
$A_4 = 4.6889 \times 10^{-5}$, $A_6 = -4.5934 \times 10^{-7}$,
$A_8 = 3.4940 \times 10^{-9}$, $A_{10} = -1.7504 \times 10^{-11}$ (Fifteenth Order)

$k = 0$,
$A_4 = 2.0032 \times 10^{-5}$, $A_6 = -1.0580 \times 10^{-6}$,
$A_8 = 1.3913 \times 10^{-8}$, $A_{10} = -6.6138 \times 10^{-11}$ -continued

(Lens Data)

(Sixteenth Order)

$k = 0$,
$A_4 = 2.3359 \times 10^{-5}, A_6 = -8.3928 \times 10^{-7}$,
$A_8 = 1.2186 \times 10^{-8}, A_{10} = -6.4391 \times 10^{-11}$ (Twenty-first Order)

$k = 0$,
$A_4 = -2.3499 \times 10^{-5}, A_6 = -1.2412 \times 10^{-7}$,
$A_8 = 2.2965 \times 10^{-9}, A_{10} = -8.5091 \times 10^{-12}$ (Twenty-second Order)

$k = 0$,
$A_4 = -2.5375 \times 10^{-6}, A_6 = -1.1587 \times 10^{-7}$,
$A_8 = 2.1605 \times 10^{-9}, A_{10} = -8.6835 \times 10^{-12}$

(Focal State Data)

| | Infinity | Minimum Object Distance (object distance 158.000 mm) |
|---|---|---|
| D(14) | 1.480 | 2.405 |
| D(16) | 6.626 | 5.702 |
| f (focal length of optical system overall) | 19.41 | 18.66 |
| FNO (F number) | 2.88 | 2.92 |
| ω (half angle of view) | 49.11 | 48.48 |
| f1 (focal length of first lens group $G_{21}$) | 10.82 | 10.82 |
| f2 (focal length of second lens group $G_{22}$) | −46.97 | −46.97 |
| f3 (focal length of third lens group $G_{23}$) | −626.90 | −626.90 |
| BF (back focus) | 25.928 | 25.928 |

(Values Related to Conditional Expression (1))

$f2/f = -2.42$ (Values Related to Conditional Expression (2))

$f1/f = 0.56$ (Values Related to Conditional Expression (3))
βinf (paraxial magnification of second lens group $G_{22}$ at focus state for object at infinity)=1.85
β mod (paraxial magnification of second lens group $G_{22}$ at focus state for minimum object distance)=1.83

$\beta\text{inf}/\beta \text{ mod} = 1.01$ (Values Related to Conditional Expression (4))
R1 (radius of curvature of surface at air interface on object side of negative lens $L_{233}$)=−400.000
R2 (radius of curvature of surface at air interface on image side of negative lens $L_{233}$)=27.667

$(R1+R2)/(R1-R2)=0.87$ (Values Related to Conditional Expression (5))
L1s (axial distance from surface farthest on object side of first lens group $G_{21}$ to aperture stop STP)=42.584
L (axial distance from apex of lens surface farthest on object side of first lens group $G_{21}$ to imaging plane IMG (overall length of optical system))=92.000

$L1s/L=0.46$ (Values Related to Conditional Expression (6))

$f3/f=-32.30$ (Values Related to Conditional Expression (7))
νdn (Abbe number with respect to d-line of negative lens $L_{233}$)=37.22

(Values Related to Conditional Expression (8))
R21 (radius of curvature of surface farthest on object side of negative lens $L_{221}$)=42.496

R22 (radius of curvature of surface farthest on image side of negative lens $L_{221}$)=18.812

$(R21+R22)/(R21-R22)=2.59$

FIG. 4 is a diagram of various types of aberration occurring in the inner focusing lens according to the second embodiment. In the diagram, for curves depicting spherical aberration, the vertical axis represents the F number (Fno), solid lines depict wavelength characteristics corresponding to d-line (λ=587.56 nm), dotted lines depict wavelength characteristics corresponding to g-line (λ=435.84 nm), and dashed lines depict wavelength characteristics corresponding to C-line (λ=656.28 nm). For curves depicting astigmatism, the vertical axis represents the maximum image height (Y), S represents characteristics of the sagittal plane and M represents characteristics of the meridional plane. For curves depicting distortion, the vertical axis represents the maximum image height (Y) and wavelength characteristics corresponding to d-line are depicted.

Figure 5:
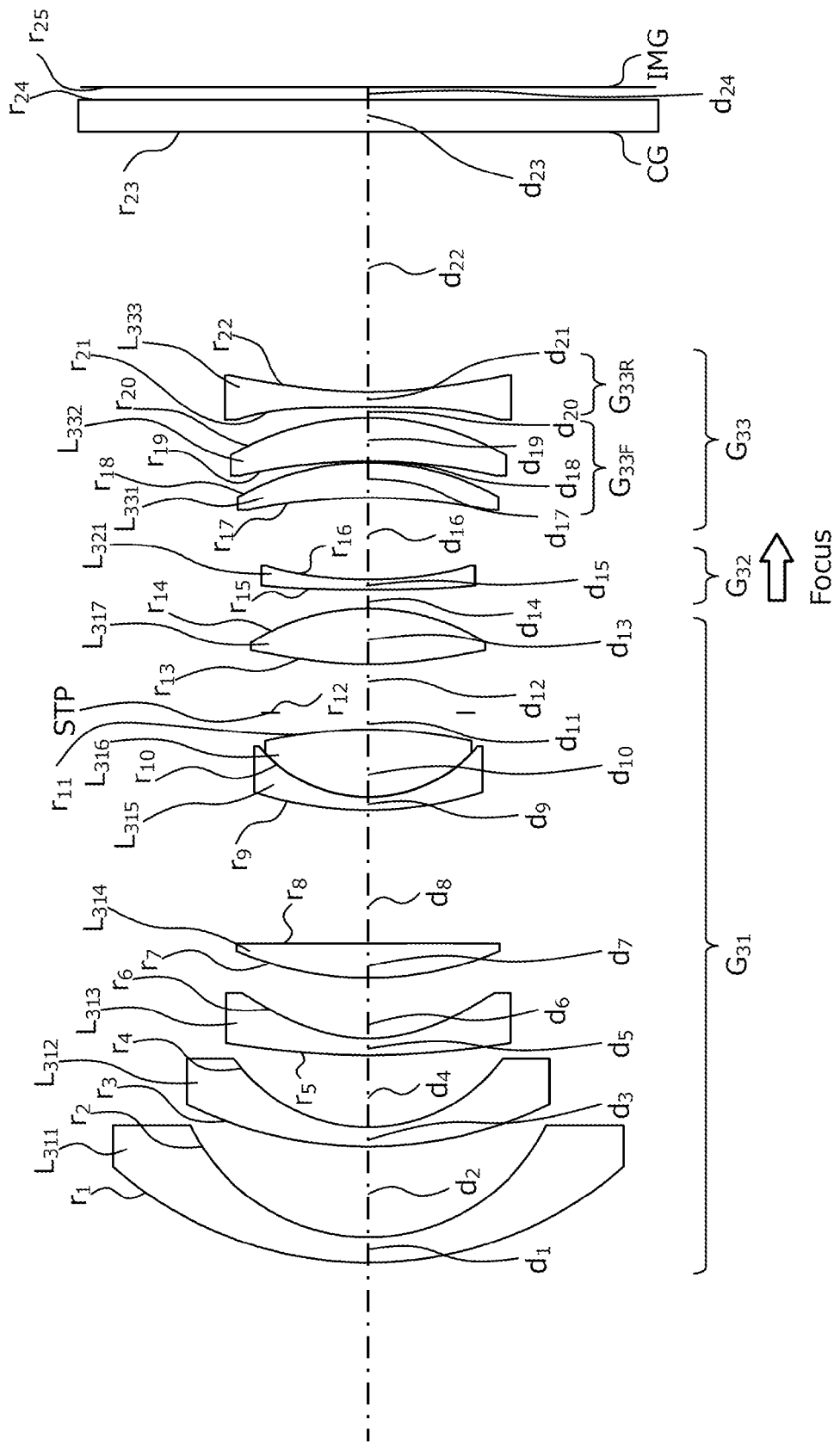
FIG. 5 is a diagram depicting, along the optical axis, a configuration of the inner focusing lens according to a third embodiment.

FIG. 5 is a diagram depicting, along the optical axis, a configuration of the inner focusing lens according to a third embodiment. FIG. 5 depicts a focus state for an object at infinity. The inner focusing lens has sequentially from the object side, a first lens group $G_{31}$ having a positive refractive power, a second lens group $G_{32}$ having a negative refractive power, and a third lens group $G_{33}$ having a negative refractive power. The cover glass CG is disposed between the third lens group $G_{33}$ and the imaging plane IMG.

The first lens group $G_3$, has sequentially from the object side, a negative meniscus lens $L_{311}$, a negative meniscus lens $L_{312}$, a negative lens $L_{313}$, a positive lens $L_{314}$, a negative lens $L_{315}$, a positive lens $L_{316}$, the aperture stop STP setting a predetermined diameter, and a positive lens $L_{317}$. Both surfaces of the negative lens $L_{313}$ are aspheric. The negative lens $L_{315}$ and the positive lens $L_{316}$ are cemented. Both surfaces of the positive lens $L_{317}$ are aspheric.

The second lens group $G_{32}$ is configured by a negative lens $L_{321}$. Both surfaces of the negative lens $L_{321}$ are aspheric.

The third lens group $G_{33}$ has sequentially from the object side, a front lens subgroup $G_{33F}$ having a positive refractive power and a rear lens subgroup $G_{33R}$ having a negative refractive power. An axial air gap that is widest in the third lens group $G_{33}$ is formed between the front lens subgroup $G_{33F}$ and the rear lens subgroup $G_{33R}$.

The front lens subgroup $G_{33F}$ has sequentially from the object side, a positive lens $L_{331}$, and a positive lens $L_{332}$. The rear lens subgroup $G_{33R}$ is configured by a negative lens $L_{333}$. The negative lens $L_{333}$ is formed of a single glass material. Both surfaces of the negative lens $L_{333}$ are aspheric.

In the inner focusing lens, the first lens group $G_{31}$ and the third lens group $G_{33}$ are fixed, while the second lens group $G_{32}$ is moved along the optical axis from the object side to the imaging plane IMG side such that the interval between the first lens group $G_{31}$ and the second lens group $G_{32}$ is increased and the interval between the second lens group $G_{32}$ and the third lens group $G_{33}$ is decreased, whereby focusing is performed from a focus state for an object at infinity to a focus state for the minimum object distance.

Here, various values related to the inner focusing lens according to the third embodiment are given.

| (Lens Data) | | | |
|---|---|---|---|
| $r_1 = 29.863$ | | | |
| $d_1 = 2.000$ | | $nd_1 = 1.5935$ | $vd_1 = 67.00$ |
| $r_2 = 15.214$ | | | |
| $d_2 = 7.108$ | | | |
| $r_3 = 31.676$ | | | |
| $d_3 = 1.500$ | | $nd_2 = 1.4970$ | $vd_2 = 81.61$ |
| $r_4 = 12.821$ | | | |
| $d_4 = 5.662$ | | | |
| $r_5 = 56.855$ (aspheric surface) | | | |
| $d_5 = 1.300$ | | $nd_3 = 1.5920$ | $vd_3 = 67.02$ |
| $r_6 = 12.496$ (aspheric surface) | | | |
| $d_6 = 4.710$ | | | |
| $r_7 = 25.649$ | | | |
| $d_7 = 2.736$ | | $nd_4 = 1.8810$ | $vd_4 = 40.14$ |
| $r_8 = -2872.181$ | | | |
| $d_8 = 10.427$ | | | |
| $r_9 = 29.340$ | | | |
| $d_9 = 1.000$ | | $nd_5 = 1.8810$ | $vd_5 = 40.14$ |
| $r_{10} = 11.062$ | | | |
| $d_{10} = 5.282$ | | $nd_6 = 1.4875$ | $vd_6 = 70.44$ |
| $r_{11} = -36.758$ | | | |
| $d_{11} = 1.300$ | | | |
| $r_{12} = \infty$ (aperture stop) | | | |
| $d_{12} = 3.832$ | | | |
| $r_{13} = 32.994$ (aspheric surface) | | | |
| $d_{13} = 4.343$ | | $nd_7 = 1.4971$ | $vd_7 = 81.56$ |
| $r_{14} = -16.586$ (aspheric surface) | | | |
| $d_{14} = D(14)$ (variable) | | | |
| $r_{15} = 168.747$ (aspheric surface) | | | |
| $d_{15} = 0.800$ | | $nd_8 = 1.7290$ | $vd_8 = 54.04$ |
| $r_{16} = 35.344$ (aspheric surface) | | | |
| $d_{16} = D(16)$ (variable) | | | |
| $r_{17} = -47.172$ | | | |
| $d_{17} = 2.755$ | | $nd_9 = 1.4970$ | $vd_9 = 81.61$ |
| $r_{18} = -20.329$ | | | |
| $d_{18} = 0.100$ | | | |
| $r_{19} = -45.060$ | | | |
| $d_{19} = 3.412$ | | $nd_{10} = 1.4970$ | $vd_{13} = 81.61$ |
| $r_{20} = -20.831$ | | | |
| $d_{20} = 0.833$ | | | |
| $r_{21} = -400.000$ (aspheric surface) | | | |
| $d_{21} = 1.200$ | | $nd_{11} = 1.8820$ | $vd_{11} = 37.22$ |
| $r_{22} = 34.153$ (aspheric surface) | | | |
| $d_{22} = 20.338$ | | | |
| $r_{23} = \infty$ | | | |
| $d_{23} = 2.500$ | | $nd_{12} = 1.5168$ | $vd_{12} = 64.20$ |
| $r_{24} = \infty$ | | | |
| $d_{24} = 1.000$ | | | |
| $r_{25} = \infty$ (imaging plane) | | | |

Constant of the Cone (k) and Aspheric Coefficients ($A_4$, $A_6$, $A_8$, $A_{10}$)

(Fifth Order)

$k = 0$,
$A_4 = -2.3716 \times 10^{-5}$, $A_6 = 1.7317 \times 10^{-7}$,
$A_8 = -6.4139 \times 10^{-10}$, $A_{10} = 1.5464 \times 10^{-12}$ (Sixth Order)

$k = 0$,
$A_4 = -8.7141 \times 10^{-5}$, $A_6 = -3.1834 \times 10^{-7}$,
$A_8 = 1.5577 \times 10^{-9}$, $A_{10} = -2.7154 \times 10^{-11}$ -continued (Thirteenth Order)

k = 0,
$A_4 = -1.4834 \times 10^{-5}, A_6 = -1.6560 \times 10^{-7},$
$A_8 = 1.3132 \times 10^{-9}, A_{10} = -1.6004 \times 10^{-11}$ (Fourteenth Order)

k = 0,
$A_4 = 2.5383 \times 10^{-5}, A_6 = -2.6971 \times 10^{-7},$
$A_8 = 1.9137 \times 10^{-9}, A_{10} = -1.9738 \times 10^{-11}$ (Fifteenth Order)

k = 0,
$A_4 = 4.8211 \times 10^{-5}, A_6 = -8.0172 \times 10^{-7},$
$A_8 = 1.0635 \times 10^{-8}, A_{10} = -4.7053 \times 10^{-11}$ (Sixteenth Order)

k = 0,
$A_4 = 5.9595 \times 10^{-5}, A_6 = -8.2829 \times 10^{-7},$
$A_8 = 1.1533 \times 10^{-9}, A_{10} = -4.9667 \times 10^{-11}$ (Twenty-first Order)

k = 0,
$A_4 = -7.9720 \times 10^{-5}, A_6 = -2.0100 \times 10^{-7},$
$A_8 = 2.0113 \times 10^{-9}, A_{10} = 7.706 \times 10^{-14}$ (Twenty-second Order)

k = 0,
$A_4 = -4.3301 \times 10^{-5}, A_6 = -1.5941 \times 10^{-7},$
$A_8 = 3.0911 \times 10^{-9}, A_{10} = -7.0460 \times 10^{-12}$ (Focal State Data)

| | Infinity | Minimum Object Distance (object distance 158.000 mm) |
|---|---|---|
| D(14) | 1.489 | 2.539 |
| D(16) | 6.373 | 5.323 |
| f (focal length of optical system overall) | 16.49 | 16.05 |
| FNO (F number ) | 2.88 | 2.91 |
| ω (half angle of view) | 53.50 | 53.14 |
| f1 (focal length of first lens group $G_{31}$) | 10.68 | 10.68 |
| f2 (focal length of second lens group $G_{32}$) | −61.48 | −61.48 |
| f3 (focal length of third lens group $G_{33}$) | −126154 | −126154 |
| BF (back focus) | 23.838 | 23.838 |

(Values Related to Conditional Expression (1))

$f2/f = -3.73$ (Values Related to Conditional Expression (2))

$f1/f = 0.65$ (Values Related to Conditional Expression (3))
βinf (paraxial magnification of second lens group $G_{32}$ at focus state for object at infinity)=1.59
β mod (paraxial magnification of second lens group $G_{32}$ at focus state for minimum object distance)=1.57

βinf/β mod=1.01

(Values Related to Conditional Expression (4))
R1 (radius of curvature of surface at air interface on object side of negative lens $L_{333}$)=−400.000
R2 (radius of curvature of surface at air interface on image side of negative lens $L_{333}$)=34.153

$(R1+R2)/(R1-R2)=0.84$ (Values Related to Conditional Expression (5))
L1s (axial distance from surface farthest on object side of first lens group $G_{31}$ to aperture stop STP)=43.025
L (axial distance from apex of lens surface farthest on object side of first lens group $G_{31}$ to imaging plane IMG (overall length of optical system))=92.000

$L1s/L=0.47$ (Values Related to Conditional Expression (6))

$f3/f=-7652.47$ (Values Related to Conditional Expression (7))
vdn (Abbe number with respect to d-line of negative lens $L_{333}$)=37.22

(Values Related to Conditional Expression (8))
R21 (radius of curvature of surface farthest on object side of negative lens $L_{321}$)=168.747
R22 (radius of curvature of surface farthest on image side of negative lens $L_{321}$)=35.344

$(R21+R22)/(R21-R22)=1.53$

FIG. 6 is a diagram of various types of aberration occurring in the inner focusing lens according to the third embodiment. In the diagram, for curves depicting spherical aberration, the vertical axis represents the F number (Fno), solid lines depict wavelength characteristics corresponding to d-line (λ=587.56 nm), dotted lines depict wavelength characteristics corresponding to g-line (λ=435.84 nm), and dashed lines depict wavelength characteristics corresponding to C-line (λ=656.28 nm). For curves depicting astigmatism, the vertical axis represents the maximum image height (Y), S represents characteristics of the sagittal plane and M represents characteristics of the meridional plane. For curves depicting distortion, the vertical axis represents the maximum image height (Y) and wavelength characteristics corresponding to d-line are depicted.

Figure 7:
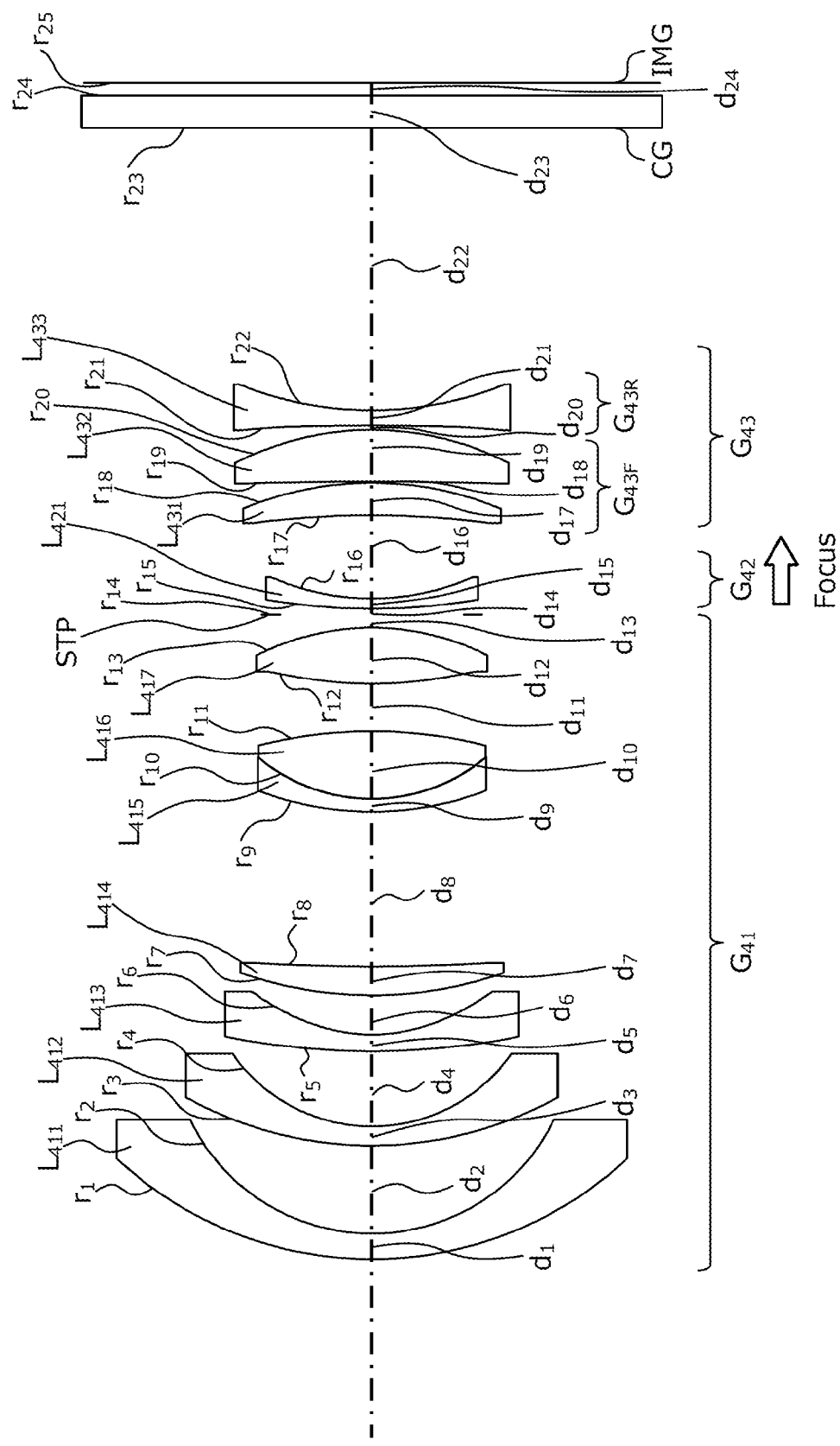
FIG. 7 is a diagram depicting, along the optical axis, a configuration of the inner focusing lens according to a fourth embodiment.

FIG. 7 is a diagram depicting, along the optical axis, a configuration of the inner focusing lens according to a fourth embodiment. FIG. 7 depicts a focus state for an object at infinity. The inner focusing lens has sequentially from the object side, a first lens group $G_{41}$ having a positive refractive power, a second lens group $G_{42}$ having a negative refractive power, and a third lens group $G_{43}$ having a negative refractive power. The cover glass CG is disposed between the third lens group $G_{43}$ and the imaging plane IMG.

The first lens group $G_{41}$ has sequentially from the object side, a negative meniscus lens $L_{411}$, a negative meniscus lens $L_{412}$, a negative lens $L_{413}$, a positive lens $L_{414}$, a negative lens $L_{415}$, a positive lens $L_{416}$, a positive lens $L_{417}$, and the aperture stop STP setting a predetermined diameter. Both surfaces of the negative lens $L_{413}$ are aspheric. The negative lens $L_{415}$ and the positive lens $L_{416}$ are cemented. Both surfaces of the positive lens $L_{417}$ are aspheric.

The second lens group $G_{42}$ is configured by a negative lens $L_{421}$. Both surfaces of the negative lens $L_{421}$ are aspheric.

The third lens group $G_{43}$ has sequentially from the object side, a front lens subgroup $G_{43F}$ having a positive refractive power and a rear lens subgroup $G_{43R}$ having a negative refractive power. An axial air gap that is widest in the third lens group $G_{43}$ is formed between the front lens subgroup $G_{43F}$ and the rear lens subgroup $G_{43R}$.

The front lens subgroup $G_{43F}$ has sequentially from the object side, a positive lens $L_{431}$ and a positive lens $L_{432}$. The rear lens subgroup $G_{43R}$ is configured by a negative lens $L_{433}$. The negative lens $L_{433}$ is formed of a single glass material. Both surfaces of the negative lens $L_{433}$ are aspheric.

In the inner focusing lens, the first lens group $G_{41}$ and the third lens group $G_{43}$ are fixed, while the second lens group $G_{42}$ is moved along the optical axis from the object side to the imaging plane IMG side such that the interval between the first lens group $G_{41}$ and the second lens group $G_{42}$ is increased and the interval between the second lens group $G_{42}$ and the third lens group $G_{43}$ is decreased, whereby focusing is performed from a focus state for an object at infinity to a focus state for the minimum object distance.

Here, various values related to the inner focusing lens according to the fourth embodiment are given.

(Lens Data)

$r_1 = 28.832$
$d_1 = 2.0000$, $nd_1 = 1.5935$, $vd_1 = 67.00$
$r_2 = 15.623$
$d_2 = 6.8857$
$r_3 = 29.397$
$d_3 = 1.5000$, $nd_2 = 1.4970$, $vd_2 = 81.61$
$r_4 = 13.122$
$d_4 = 5.8831$
$r_5 = 52.568$ (aspheric surface)
$d_5 = 1.3000$, $nd_3 = 1.5920$, $vd_3 = 67.02$
$r_6 = 12.910$ (aspheric surface)
$d_6 = 3.0680$
$r_7 = 30.333$
$d_7 = 2.2648$, $nd_4 = 1.8810$, $vd_4 = 40.14$
$r_8 = 141.737$
$d_8 = 12.0987$
$r_9 = 24.676$
$d_9 = 1.0000$, $nd_5 = 1.8810$, $vd_5 = 40.14$
$r_{10} = 13.601$ -continued $d_{10} = 5.2921$, $nd_6 = 1.4875$, $vd_6 = 70.44$
$r_{11} = -35.502$
$d_{11} = 3.7248$
$r_{12} = 30.850$ (aspheric surface)
$d_{12} = 4.3865$, $nd_7 = 1.4971$, $vd_7 = 81.56$
$r_{13} = -18.338$ (aspheric surface)
$d_{13} = 1.0000$
$r_{14} = \infty$ (aperture stop)
$d_{14} = D(14)$ (variable)
$r_{15} = 45.781$ (aspheric surface)
$d_{15} = 0.8000$, $nd_8 = 1.7290$, $vd_8 = 54.04$
$r_{16} = 19.193$ (aspheric surface)
$d_{16} = D(16)$ (variable)
$r_{17} = -68.737$
$d_{17} = 2.5350$, $nd_9 = 1.4970$, $vd_9 = 81.61$
$r_{18} = -25.555$
$d_{18} = 0.1000$
$r_{19} = -329.577$
$d_{19} = 4.0360$, $nd_{10} = 1.4970$, $vd_{10} = 81.61$
$r_{20} = -23.042$
$d_{20} = 0.3290$
$r_{21} = -400.000$ (aspheric surface)
$d_{21} = 1.2000$, $nd_{11} = 1.8820$, $vd_{11} = 37.22$
$r_{22} = 26.785$ (aspheric surface)
$d_{22} = 25.606$
$r_{23} = \infty$
$d_{23} = 2.5000$, $nd_{12} = 1.5168$, $vd_{12} = 64.20$
$r_{24} = \infty$
$d_{24} = 1.0000$
$r_{25} = \infty$ (imaging plane)

Constant of the Cone (k) and Aspheric Coefficients ($A_4$, $A_6$, $A_8$, $A_{10}$)

(Fifth Order)

$k = 0$,
$A_4 = -2.6625 \times 10^{-5}$, $A_6 = 3.0031 \times 10^{-7}$,
$A_8 = -1.7989 \times 10^{-9}$, $A_{10} = 5.7847 \times 10^{-12}$ (Sixth Order)

$k = 0$,
$A_4 = -6.8334 \times 10^{-5}$, $A_6 = 8.4364 \times 10^{-9}$,
$A_8 = -1.2228 \times 10^{-9}$, $A_{10} = -9.8374 \times 10^{-12}$ (Twelfth Order)

$k = 0$,
$A_4 = -2.2269 \times 10^{-5}$, $A_6 = 1.1253 \times 10^{-9}$,
$A_8 = -1.0562 \times 10^{-9}$, $A_{10} = -3.1969 \times 10^{-12}$ (Thirteenth Order)

$k = 0$,
$A_4 = 5.1791 \times 10^{-5}$, $A_6 = -5.2286 \times 10^{-7}$,
$A_8 = 4.0083 \times 10^{-9}$, $A_{10} = -2.3692 \times 10^{-11}$ (Fifteenth Order)

$k = 0$,
$A_4 = 2.0348 \times 10^{-5}$, $A_6 = -1.1141 \times 10^{-6}$,
$A_8 = 1.4175 \times 10^{-8}$, $A_{10} = -5.7786 \times 10^{-11}$ (Sixteenth Order)

$k = 0$,
$A_4 = 2.1580 \times 10^{-5}$, $A_6 = -8.9505 \times 10^{-7}$,
$A_8 = 1.2780 \times 10^{-8}$, $A_{10} = -5.7413 \times 10^{-11}$ (Twenty-first Order)

$k = 0$,
$A_4 = -2.4151 \times 10^{-5}$, $A_6 = -1.3394 \times 10^{-7}$,
$A_8 = 2.2182 \times 10^{-9}$, $A_{10} = -7.5852 \times 10^{-12}$ (Twenty-second Order)

$k = 0$,
$A_4 = -3.5206 \times 10^{-6}$, $A_6 = -1.2925 \times 10^{-7}$,
$A_8 = 2.2655 \times 10^{-9}$, $A_{10} = -8.5817 \times 10^{-12}$ -continued (Focal State Data)

|  | Infinity | Minimum Object Distance (object distance 158.000 mm) |
| --- | --- | --- |
| D(14) | 0.4719 | 1.3177 |
| D(16) | 5.8194 | 4.9736 |
| f (focal length of optical system overall) | 18.54 | 17.89 |
| FNO (F number) | 2.88 | 2.93 |
| ω (half angle of view) | 50.29 | 49.47 |
| f1 (focal length of first lens group $G_{41}$) | 10.28 | 10.28 |
| f2 (focal length of second lens group $G_{42}$) | −45.92 | −45.92 |
| f3 (focal length of third lens group $G_{43}$) | −722.75 | −722.75 |
| BF (back focus) | 29.106 | 29.106 |

(Values Related to Conditional Expression (1))

$f2/f=-2.48$ (Values Related to Conditional Expression (2))

$f1/f=0.55$ (Values Related to Conditional Expression (3))
βinf (paraxial magnification of second lens group $G_{42}$ at focus state for object at infinity)=1.83
β mod (paraxial magnification of second lens group $G_{42}$ at focus state for minimum object distance)=1.81

$\beta inf/\beta\ mod=1.01$ (Values Related to Conditional Expression (4))
R1 (radius of curvature of surface at air interface on object side of negative lens $L_{433}$)=−400.000
R2 (radius of curvature of surface at air interface on image side of negative lens $L_{433}$)=26.785

$(R1+R2)/(R1-R2)=0.87$ (Values Related to Conditional Expression (5))
L1s (axial distance from surface farthest on object side of first lens group $G_{41}$ to aperture stop STP)=50.4037
L (axial distance from apex of lens surface farthest on object side of first lens group $G_{41}$ to imaging plane IMG (overall length of optical system))=94.8010

$L1s/L=0.53$ (Values Related to Conditional Expression (6))

$f3/f=-38.97$ (Values Related to Conditional Expression (7))
vdn (Abbe number with respect to d-line of negative lens $L_{433}$)=37.22
(Values Related to Conditional Expression (8))
R21 (radius of curvature of surface farthest on object side of negative lens $L_{421}$)=45.781
R22 (radius of curvature of surface farthest on image side of negative lens $L_{421}$)=19.193

$(R21+R22)/(R21-R22)=2.44$

FIG. 8 is a diagram of various types of aberration occurring in the inner focusing lens according to the fourth embodiment. In the diagram, for curves depicting spherical aberration, the vertical axis represents the F number (Fno), solid lines depict wavelength characteristics corresponding to d-line (λ=587.56 nm), dotted lines depict wavelength characteristics corresponding to g-line (λ=435.84 nm), and dashed lines depict wavelength characteristics corresponding to C-line (λ=656.28 nm). For curves depicting astigmatism, the vertical axis represents the maximum image height (Y), S represents characteristics of the sagittal plane and M represents characteristics of the meridional plane. For curves depicting distortion, the vertical axis represents the maximum image height (Y) and wavelength characteristics corresponding to d-line are depicted.

Among the values for each of the embodiments, $r_1$, $r_2$, . . . indicate the radius of curvature of lens surfaces, diaphragm surface, etc.; $d_1$, $d_2$, . . . indicate the thickness of the lenses, the diaphragm, etc. or the interval between the surfaces thereof; $nd_1$, $nd_2$, . . . indicate the refraction index of the lenses with respect to the d-line (λ=587.56 nm); and $vd_1$, $vd_2$, . . . indicate the Abbe number for the d-line (λ=587.56 nm) of the lenses. Further, back focus (BF) represents the distance from the last surface of the optical system to the paraxial imaging plane. The overall length of the optical system is the distance from the surface farthest on the object side to the last lens surface plus the BF. Lengths are indicated in units of "mm"; and angles are indicated in "degrees".

Each aspheric surface shape above is expressed by the equation below; where, Z is the depth of the aspheric surface, c(1/r) is curvature; h is the height from the optical axis; k is the constant of the cone; $A_4$, $A_6$, $A_8$, $A_{10}$ are respectively fourth order, sixth order, eighth order, and tenth order aspheric coefficients; and the travel direction of light is assumed to be positive.

$$Z = \frac{ch^2}{1+\sqrt{1-(1+k)c^2h^2}} + A_4h^4 + A_6h^6 + A_8h^8 + A_{10}h^{10}$$

In the embodiments, an example of an inner focusing lens having focal lengths accommodating wide angles of view by a 35 mm film camera conversion has been given. The inner focusing lens of the embodiments facilitates reductions in the size and weight of the focusing group and therefore, can favorably perform high-speed autofocus processing, essential for video filming. In particular, by satisfying the conditional expressions above, an inner focusing lens that is optimal for capturing video, is compact, and has high imaging performance at wide angles can be realized.

According to the embodiments, a compact inner focusing lens having high imaging performance, a wide angle focal length, and a compact, light-weight focusing group can be realized.

According to the embodiments, an inner focusing lens can be realized that is even more compact and has high imaging performance.

According to the embodiments, field curvature consequent to focusing can be suppressed, enabling improved imaging performance.

According to the embodiments, the diameter of the lens near the imaging plane can be reduced, and on-axis aberration and off-axis aberration (particularly, distortion) can be favorably corrected.

According to the embodiments, the diameter of the third lens group (lens farthest on the image side) can be reduced and off-axis coma aberration can be favorably corrected.

According to the embodiments, front lens and rear lens diameters can be reduced while maintaining imaging performance, enabling further reductions in the size of the optical system.

According to the embodiments, reduction in the size and weight of the second lens group, which is the focusing group, are facilitated, enabling an inner focusing lens suitable for capturing video to be provided.

According to the embodiments, the overall length of the optical system can be reduced and imaging performance can be improved.

According to the embodiments, the simple lens element having a negative refractive power and included in the third lens group can be reduced in size and weight, and chromatic difference of magnification can be favorably corrected.

According to the embodiments, an effect is achieved in that a compact inner focusing lens having high imaging performance, a wide angle focal length, and a compact, light-weight focusing group can be provided. According to the embodiments, a compact inner focusing lens also optimal for capturing video can be provided.

As described, the inner focusing lens according to the present invention is useful for compact imaging apparatuses such as still image cameras and video cameras, and is particularly suitable for imaging apparatuses used for capturing moving images.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An inner focusing lens comprising sequentially from an object side thereof:
   a first lens group having a positive refractive power;
   a second lens group having a negative refractive power; and
   a third lens group having a negative refractive power, wherein
   the first lens group includes farthest on an object side thereof, at least one negative meniscus lens,
   focusing is performed from a focus state at infinity to a focus state for a minimum object distance by moving the second lens group along an optical axis, from the object side to an image side such that an interval between the first lens group and the second lens group increases and an interval between the second lens group and the third lens group decreases, while the first lens group and the third lens group remain fixed, and
   the inner focusing lens satisfies a conditional expression (1) $-7.46 \leq f2/f \leq -2.11$, where f2 is a focal length of the second lens group at the focus state at infinity and f is an overall optical-system focal length at the focus state at infinity.

2. The inner focusing lens according to claim 1, wherein the inner focusing lens satisfies a conditional expression (2) $0.28 \leq f1/f \leq 1.30$, where f1 is a focal length of the first lens group at the focus state at infinity.

3. The inner focusing lens according to claim 1, wherein the inner focusing lens satisfies a conditional expression (3) $0.505 \leq \beta inf/\beta\ mod \leq 2.02$, where βinf is paraxial magnification of the second lens group at the focus state at infinity and β mod is the paraxial magnification of the second lens group at the focus state for the minimum object distance.

4. The inner focusing lens according to claim 1, wherein
   the third lens group includes sequentially from an object side thereof, a front lens subgroup having a positive refractive power and a rear lens subgroup having a negative refractive power, and
   an axial air gap that is widest in the third lens group is formed between the front lens subgroup and the rear lens subgroup.

5. The inner focusing lens according to claim 1, wherein
   the third lens group includes farthest on an image side thereof, a simple lens element having a negative refractive power, and
   the inner focusing lens satisfies a conditional expression (4) $0 \leq (R1+R2)/(R1-R2)$, where R1 is radius of curvature of a surface of the simple lens element, at an air interface on an object side of the simple lens element and R2 is radius of curvature of a surface of the simple lens element, at the air interface on an image side of the simple lens element.

6. The inner focusing lens according to claim 1 and further comprising
   an aperture stop that sets a predetermined diameter, wherein
   the inner focusing lens satisfies a conditional expression (5) $0.24 \leq L1s/L \leq 0.95$, where L1s is an axial distance from a surface farthest on the object side of the first lens group to the aperture stop and L is the overall optical-system focal length, which is an axial distance from an apex of a lens surface farthest on the object side in the optical system to an imaging plane.

7. The inner focusing lens according to claim 1, wherein the second lens group is configured by a simple lens element having a negative refractive power.

8. The inner focusing lens according to claim 1, wherein the inner focusing lens satisfies a conditional expression (6) $f3/f \leq -29.1$, where f3 is a focal length of the third lens group at the focus state at infinity.

9. The inner focusing lens according to claim 1, wherein
   the third lens group includes a simple lens element having a negative refractive power,
   the simple lens element is formed of a single glass material, and
   the inner focusing lens satisfies a conditional expression (7) $30 \leq vdn$, where vdn is an Abbe number with respect to d-line of the simple lens element.

* * * * *